Oct. 22, 1968 TSUNEO ARAKI ET AL 3,407,266

SYSTEM FOR REPRODUCING MAGNETICALLY RECORDED TELEVISION SIGNALS INCLUDING A VERTICAL SYNC PULSE GENERATOR

Filed Jan. 26, 1965 4 Sheets-Sheet 1

Tsuneo Araki
Taichi Takeda
INVENTORS

BY George Auerbach
Attorney

Tsuneo Araki
Taichi Takeda
INVENTORS

BY George B. Oujevolk
Attorney

Tsuneo Araki
Taichi Takesa
INVENTORS

BY George B. Oujevolk
Attorney

INVENTORS
Tsuneo Araki
Taichi Takeda
BY
George B. Oujevolk
Attorney

United States Patent Office 3,407,266
Patented Oct. 22, 1968

3,407,266
SYSTEM FOR REPRODUCING MAGNETICALLY RECORDED TELEVISION SIGNALS INCLUDING A VERTICAL SYNC PULSE GENERATOR

Tsuneo Araki, Tokyo, and Taichi Takesa, Yokohama-shi, Japan, assignors to Tokyo Shibaura Electric Co., Ltd., Kawasaki-shi, Japan, a corporation of Japan Filed Jan. 26, 1965, Ser. No. 428,163
Claims priority, application Japan, Jan. 29, 1964, 39/4,007, 39/4,008
2 Claims. (Cl. 178—6.6)

ABSTRACT OF THE DISCLOSURE

A magnetic tape having a plurality of magnetic record zones each including at least one field unit of the image signal with at least a portion of the vertical blanking period deleted, a main magnetic head adapted to scan said magnetic record zones to produce main signals including a signal absence period in at least a portion of the vertical blanking period, an auxiliary magnetic head driven in riod deleted, a main magnetic head adapted to scan said magnetic record zones to reproduce auxiliary signals with a predetermined time difference with respect to the main signals, means to set said time difference in at least said signal absence period of said main signals and means to insert said auxiliary signal or a signal produced by utilizing said auxiliary signal as the reference into said main signal absence period.

This invention relates to improvements of a system of reproducing magnetically recorded images such as television image signals.

As is well known in the television art, the so-called one head or two head magnetic image recording and reproducing system has been developed. But in the one head system distortions in the reproduced images are inevitable due to signal absence period in the magnetic record zones or tracks owing to imperfect encircling of magnetic tapes around a guide cylinder. In the two head system which has been developed to eliminate this difficulty not only the utilization factor of the magnetic tapes is lowered but also the electrical circuits and the adjustment thereof are very complex.

It is an object of this invention to provide a novel system of reproducing magnetically recorded images which can eliminate distortions of the reproduced images by utilizing a relatively simple mechanism and associated electric circuit.

Further object of this invention is to provide an improved system of reproducing magnetically recorded images which can eliminate the necessity of utilizing auxiliary magnetic tapes, thus improving the utilization factor of the magnetic tape.

Briefly stated a preferred embodiment of this invention comprises a magnetic tape having a plurality of magnetic record zones each including at least one field unit of the image signal with at least a portion of the vertical blanking period deleted, a main magnetic head adapted to scan said magnetic record zones to produce main signals including a signal absence period in at least a portion of the vertical blanking period, an auxiliary magnetic head driven in synchronism with said main magnetic head to scan said magnetic record zones to reproduce auxiliary signals with a predetermined time difference with respect to the main signals, means to set said time difference in at least said signal absence period of said main signals and means to insert said auxiliary signal or a signal produced by utilizing said auxiliary signal as the reference into said main signal absence period.

While the specification concludes with claims particularly pointing out and distinctly claiming the subject matter which is regarded as the invention, it is believed that the invention will be better understood from the following description taken in connection with the accompanying drawings, in which:

In order to have better understanding of this invention the construction and operation of the prior art device of magnetically recording and reproducing images by means of a single magnetic head will be considered at first.

Figure 1:
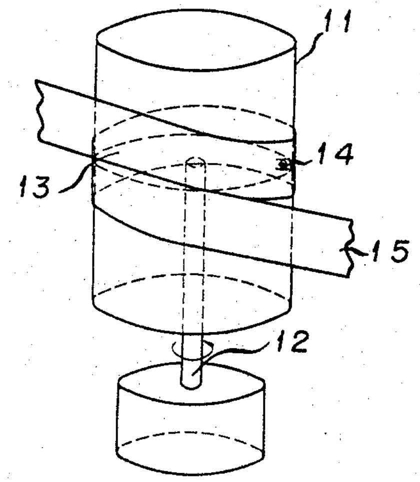
FIGS. 1 and 2 are diagrammatic perspective views illustrating two forms of the prior art magnetic recording apparatus.
Figure 2:
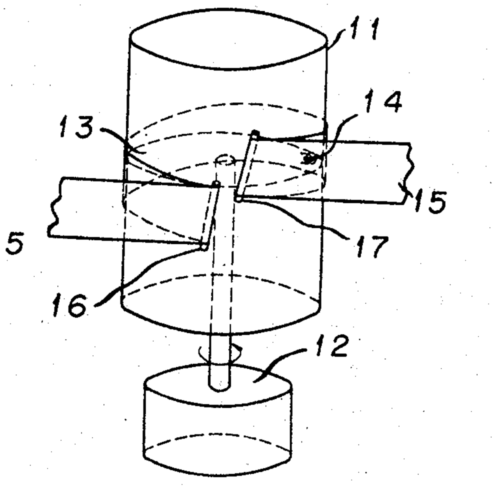
Figures 3, 4:
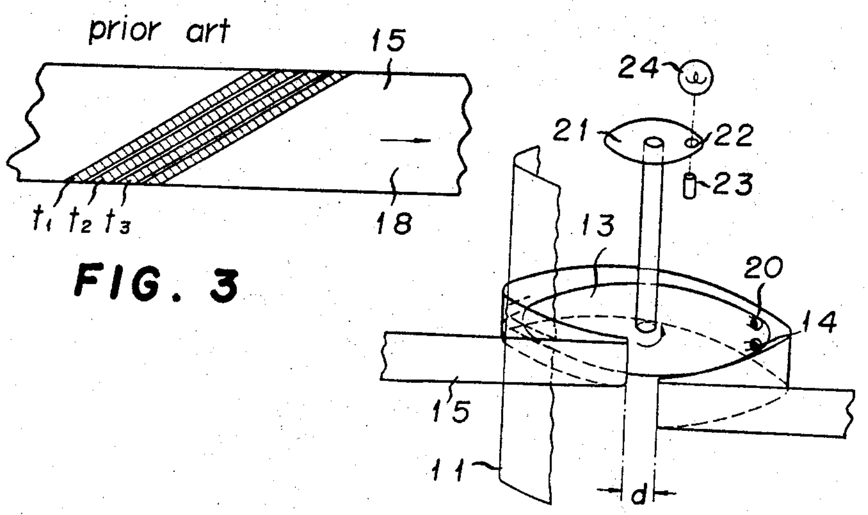
FIG. 3 shows a portion of a magnetic tape and magnetic record zones formed thereon by said prior art recording device.
FIG. 4 is a schematic view of one embodiment of this invention.

As diagrammatically shown in FIGS. 1 and 2, the prior art device of magnetically recording and reproducing images by means of a single magnetic head comprises a stationary hollow guide cylinder 11 and a rotating disc 13 disposed in said cylinder and arranged to be driven by a suitable driving mechanism 12 such as an electric motor. A magnetic head 14 is mounted on the peripheral portion of said circular disc to project through a slit cut through the cylinder so as to produce magnetic record zones or tracks which are at an angle with respect to the longitudinal axis of a magnetic tape 15 caused to run around the cylinder 11. In the arrangement shown in FIG. 1, the magnetic tape forms one complete turn around the cylinder 11, but in the arrangement shown in FIG. 2, the magnetic tape is guided by guide rolls 16 and 17 so that it will encircle the cylinder 11 by an angle a little short of one complete turn or 360°. As shown in FIG. 3 the magnetic record zones $t_1$, $t_2$, $t_3$ . . . thus produced make an angle with respect to the direction of travel of the magnetic tape 15 indicated by an arrow 18. Thus, by so forming magnetic record zones as to have a length longer than the width of the tape it becomes possible to record one field of television image signals in the same magnetic record zone.

The respective fields of the image signals should be continuous in time with strictly predetermined spacings so that in transferring the magnetic head from one magnetic zone, for example $t_1$, to the next succeeding zone $t_2$, there should be no time lag. However, with the device for magnetically recording and reproducing images of the type referred to the above, it is impossible to produce magnetic record zones on the magnetic tape 15 and hence to record signals thereon while the magnetic head 15 is travelling across a space between guide rolls 16 and 17, as shown in FIG. 2. Such a trouble is also encountered in the device shown in FIG. 1 although not substantial. Taking this into consideration it is usual to control the rotational phase of the magnetic head so as to cause this no signal record portion to align with the vertical blanking period. However, since absence of signal occurs at a portion of such sysnchronizing signals as horizontal signal, vertical signal, equalizing pulse and the like so that even if the signal absence period is selected to be within the vertical blanking period it would be inevitable to distort horizontal scanning lines and hence the reproduced images.

In order to eliminate such a distortion a so-called two magnetic head type system has been proposed wherein a second rotating disc having an auxiliary magnetic head mounted thereon to perform recording and reproduction is mounted in concentric and superposed relation with respect to the rotating disc having the main magnetic head for magnetic recording and reproduction, said auxiliary magnetic head being positioned to lead or lag with regard to the main magnetic head and wherein the same image signal is applied to both of said magnetic heads so as to produce different magnetic record zones which are adjacent with each other on a magnetic tape. More particularly the signal absence portion or period of the main magnetic head is recorded on the auxiliary or separate magnetic record zone at a different time phase by means of said auxiliary magnetic head thereby to reproduce continuous image signals.

However utilization of two independent magnetic record zones for the same image signal will not only result in the decrease in the utilization factor of the magnetic tape but also require identical recording amplifiers for both of the main and auxiliary magnetic heads thus rendering more difficult and complicating the treatment of the respective magnetic head signals. Further, since two magnetic record zones are formed and reproduced side by side it is difficult to properly set the relative positions of two heads, thus requiring to use separate rotating disc for each head.

It is a feature of this invention to provide a new and improved system of magnetically recording and reproducing images which eliminate the above described difficulties of the prior art device utilizing one or two magnetic heads.

Referring now to FIG. 4 of the accompanying drawing which diagrammatically illustrates one embodiment of this invention, there is shown a circular disc 13 which is disposed in a hollow guide cylinder 11 and is arranged to be driven by a suitable driving mechanism, not shown. A main magnetic head 14 for reproducing the record is mounted at a requisite position on the peripheral portion of the rotating disc 13 and an auxiliary magnetic head 20 for reproducing is mounted on the same disc by a certain angle ahead of the main head in the direction of rotation of said disc. Further a disc 21 for setting the reference phase in a manner to be described later is provided coaxially with the rotating disc 13, and is rotated by the same driving mechanism as the disc 13. A light transmitting slit or opening 22 is provided near the periphery of the disc 21. A photo-electric transducer 23 such as a photo-transistor is situated on one side of the slit while a light source 24 is on the other side. A magnetic tape 15 is guided by means of a suitable guide means such as rollers 16 and 17 to pass around the guide cylinder and is scanned by magnetic heads 14 and 20 projecting through slits (not shown) cut through the peripheral surface of the guide cylinder 11. The spacing between these magnetic heads are determined dependent upon the width of a gap *d* between guide rollers where the magnetic tap 15 does not surround the guide cylinder.

In operation the disc 13 is rotated to cause the magnetic heads 14 and 20 to scan the magnetic record zones in the magnetic tape which have been previously recorded by the action of the main magnetic head 14 and contain signal absence periods. Thus the main magnetic head will function to reproduce a signal corresponding to the image signal from the magnetic tape and during this signal absence period the auxiliary magnetic head 20 which is positioned ahead of the main magnetic head will produce the signal of the next field so that a continuous signal can be produced by interposing the latter signal in the signal absence period of the former signal. Inasmuch as the period of one revolution of the main magnetic head 14 corresponds to one field of the image signal, even when the signal absence period is set to correspond to the vertical blanking period, the auxiliary magnetic head 20 which is positioned to scan the same magnetic tape in advance to the main magnetic head would reproduce a signal, such as a horizontal synchronizing pulse, an image signal and the like which are different from a signal corresponding to the signal absence period. However it is easy to obtain a reproduced image signal in the form of a perfectly continuous signal by suitable combination of this rotating disc system and a conventional electronic circuit means. In this case, dependent upon the difference in the state of signal absence, corresponding treatment of signal shaping should be made, and the means for interposing correction signal in the absence period should also be varied, but various necessary pulse signals should be shaped by taking the auxiliary signal reproduced from the auxiliary magnetic head as the reference.

The term "various pulses" is meant to designate an equalizing pulse, a vertical synchronizing pulse, and a horizontal synchronizing pulse in a vertical blanking period. One example of inserting these pulses when they are reproduced will now be described hereunder.

Figure 5:
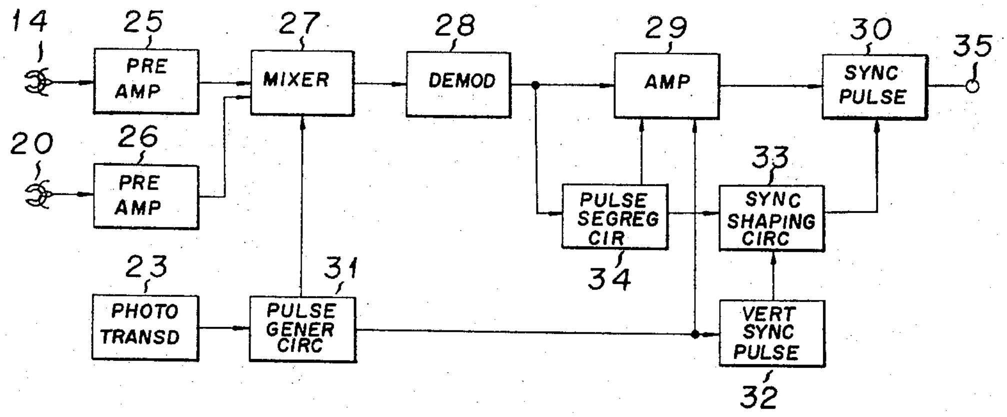
FIG. 5 is a block diagram of a reproducing system embodying this invention.
Figure 7:
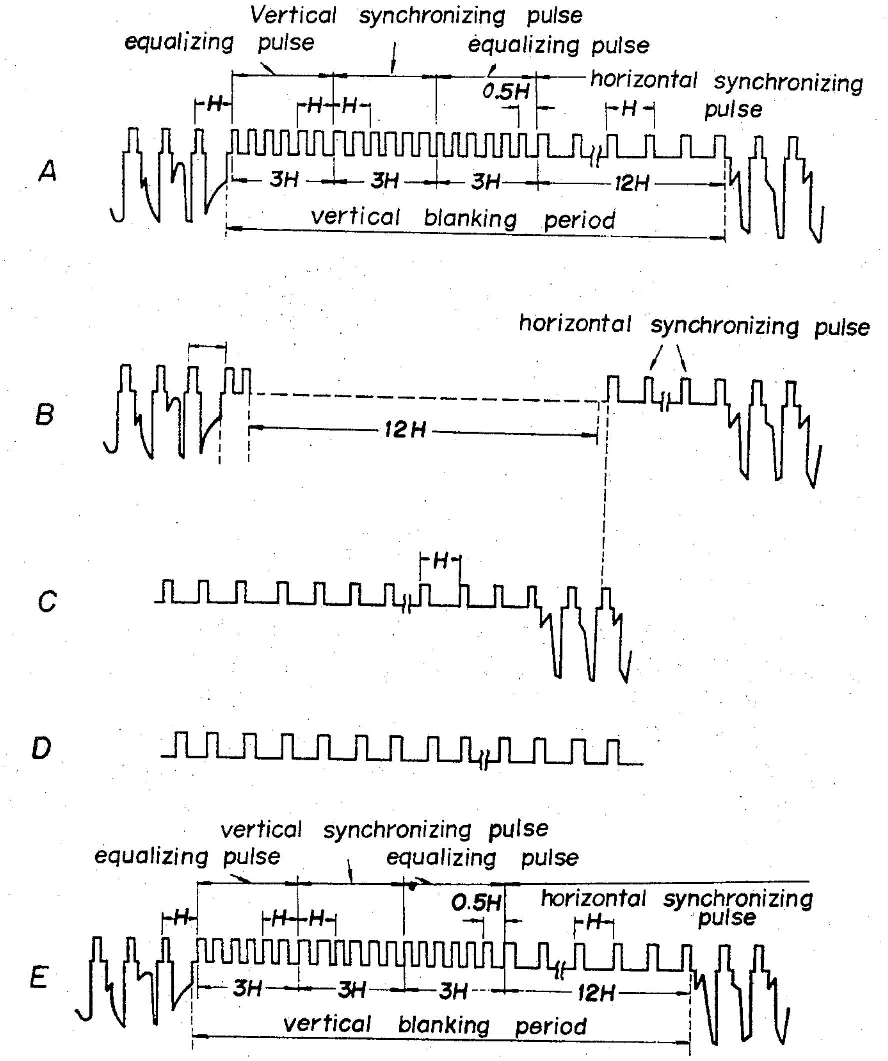
FIG. 7 shows wave forms to explain the operation of the reproducing system shown in FIG. 5.

FIG. 5 shows a block diagram of a circuit for combining signals obtained from the main and auxiliary magnetic heads to provide perfectly continuous signals and FIG. 7 shows various wave forms to explain the operation of the circuit.

When one field of the image signal to be recorded (see FIG. 7A) is recorded in one magnetic record zone, the signal which is to be actually recorded will have a wave form whose one portion is absent or deleted as shown in FIG. 7B. In accordance with this invention, the signal absence period is selected to reside in the vertical blanking period containing a pre-stage equalizing pulse, a vertical synchronizing pulse, an aft-stage equalizing pulse and a horizontal synchronizing pulse so that the information regarding the reproduced image may not be impaired and the signal absence period is selected to be equal to 12H ($H$=one horizontal synchronizing pulse period) which is selected to be sufficiently ample by due consideration of the mechanical limitation imposed by the magnetic recording and reproducing mechanism as shown in FIG. 7B. As can be noted from FIG. 7A, the image signal to be recorded is constituted by pre-stage equalizing pulses of the duration 3H, vertical equalizing pulses of 3H, aft-stage equalizing pulses of 3H and horizontal synchronizing pulses of 12H, all of which being included in one vertical blanking period, and the signal absence period of the signal which has been recorded extends between a certain one of pre-stage equalizing pulses to a certain one of horizontal synchronizing pulses. As a result, the main image signal reproduced by the main magnetic head will also be shown by a curve of FIG. 7B.

In the reproducing operation, the auxiliary magnetic head 20 which is mounted on the rotating disc in advance by a predetermined distance or angle sufficient to establish a predetermined time difference of over 12H with respect to the main magnetic head 14 will operate to reproduce an auxiliary signal comprising a portion of the horizontal synchronizing pulses and a portion of the image signal reproduced by the main magnetic head 14 after 12H during the signal absence period reproduced by the main magnetic head 14, as shown in FIG. 7C.

Referring now to FIG. 5, signals produced by the main and auxiliary magnetic heads 14 and 20 are amplified by pre-amplifiers 25 and 26, respectively, and are then supplied to a gate mixer circuit 27 to be selectively mixed together so as to derive out a continuous signal consisting of the main signal reproduced by the main magnetic head and the auxiliary signal reproduced by the auxiliary magnetic head and inserted in the signal absence period of the main signal. The derived out signal will then be demodulated by a demodulator 28. If desired the demodulated signal can be subjected to an auxiliary amplification, such as removal of the image signal component in the auxiliary signal, by means of a process amplifier 29, and the output thereof will be added to the synchronizing pulses which are controlled by a synchronizing pulse applying circuit 30 whereby to provide at an output terminal 35 a correct image signal shown in FIG. 7E.

The disc 21 for setting the reference phase shown in FIG. 4 is rotated in synchronism with the rotating disc 13 carrying the magnetic heads 14 and 20 to periodically interrupt the light beam emanating from the light source 24 and impinges upon the photo-electric transducer 23. Thus, periodic interruption of light beam will generate in the photo-electric transducer 23, an electric pulse which is synchronous with the rotation of magnetic heads and is supplied to a gate pulse generating circuit 31, FIG. 5. Availing this pulse as the reference, the circuit 31 will produce a gate pulse which is applied to the gate mixer circuit 27 to effect switching of signals and also to a circuit 32 for setting the vertical synchronizing pulse to generate a phase controlled vertical synchronizing pulse that is applied to a synchronous shaping circuit 33. The output from the gate pulse generating circuit 31 is also supplied to a process amplifier 29 to supplement its operation.

A portion of the signal demodulated as described hereinabove is supplied to a synchronizing pulse segregator circuit 34. A portion of the synchronizing pulse segregated by this circuit is supplied to the process amplifier 29 while the other portion is supplied to the synchronous shaping circuit 33 in which it is shaped its phase and width. The synchronous shaping circuit 33 also functions to remove the image signal component from the output of the segregator circuit 34, as shown in FIG. 7D and to add the vertical synchronizing pulse to the shaped wave to provide an output to the synchronous pulse adding circuit 30. In this regard it is to be understood that the phases of the horizontal synchronizing pulses, respectively derived from the main and auxiliary signals, should be adjusted so that they align each other with a time difference equal to an integer multiple of 1H.

While this phase adjustment may be made to a certain extent by the setting of relative spacing between the main and auxiliary magnetic heads, it is possible to make it more accurate by an electrical correction. Thus, the circuit construction described above enables to form a group of synchronizing pulses controlled by the auxiliary signal during the vertical blanking period, thus providing a continuous signal shown in FIG. 7E which is quite identical to the recorded signal shown in FIG. 7A.

It is to be understood that means for generating pulses which are adapted to operate the gate pulse generator or pulses synchronous with the rotational phase of the head may be of any suitable electrical or mechanical means other than the above described photo-electric transducer, for example, pulses in the main signal.

This invention is also effective for such an application where several field units are recorded in each magnetic record zone of the magnetic tape. However in any case it is advantageous to set the signal absence period of the main signal in the vertical blanking period.

Figure 6:
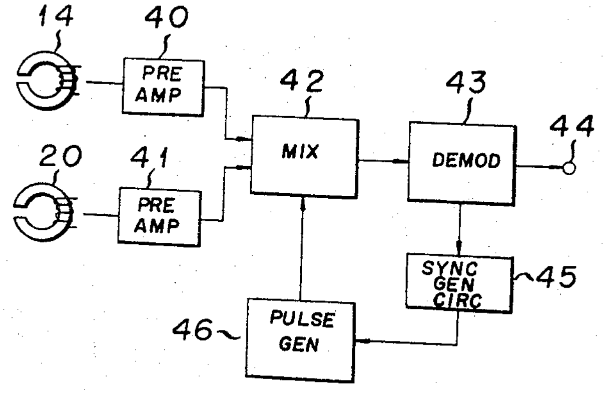
FIG. 6 is a block diagram of another embodiment of this invention.
Figure 8:
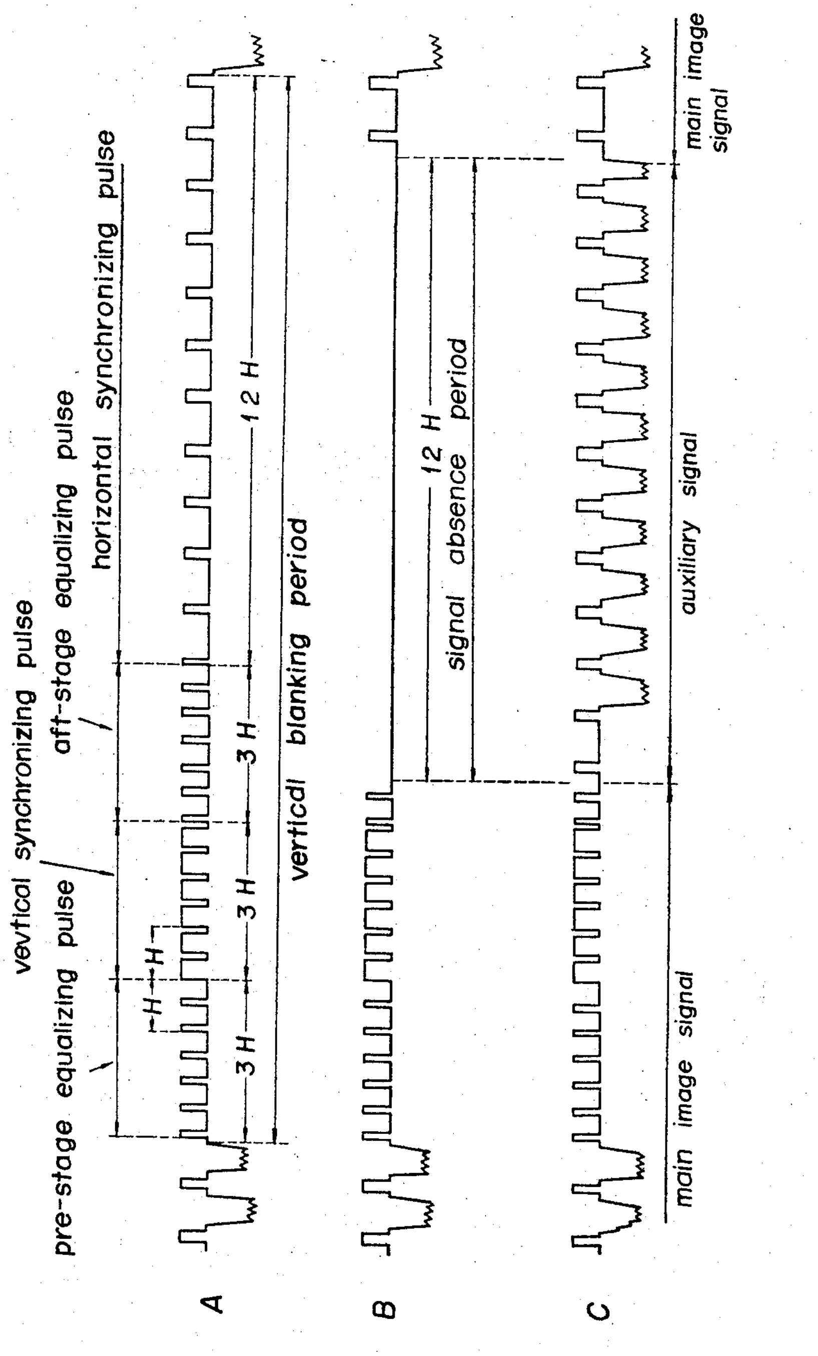
FIG. 8 shows wave forms to explain the operation of the embodiment shown in FIG. 6.

FIG. 6 shows a modification of this invention which can provide an operation identical to that of the first embodiment by utilizing a simplified circuit construction for combining signals obtained from the main and auxiliary magnetic heads into a perfectly continuous signal, and FIG. 8 shows a group of wave forms to explain the operation thereof.

The image signal to be recorded on a magnetic tape has a vertical synchronizing signal for each of the field sections and during an interval in which transition to the next field is made, a horizontal synchronizing pulse is added thereto in order to obtain correct images. This interval is made equal to the vertical blanking period so that the respective vertical synchronizing signals may not appear in the reproduced images. More particularly, as shown in FIG. 8A, within one vertical blanking period are included, for example, pre-stage equalizing pulses of the duration of 3H, vertical synchronizing pulses of 3H, aft-stage equalizing pulses of 3H and horizontal synchronizing pulses not incorporated with the image signal of 12H, where H representing one horizontal synchronizing pulse period.

In this embodiment if it is assumed that the signal absence period *d*, shown in FIG. 4, were selected to be equal to 12H in view of the limitation caused by its circuit construction, each of the magnetic record zones produced on the magnetic tape 15 by the main magnetic head 14 at a rate of one zone per one field of the image signal would have a signal absence period corresponding to 12H. Usually the signal absence period is set in the vertical blanking period having no effect upon the image information, and the image signal recorded by the main magnetic head 14 will become to that shown by FIG. 8B. In this embodiment, the signal absence period covers a portion of the aft-stage equalizing pulses and a portion of the horizontal synchronizing pulses so that the pre-stage equalizing pulses and the vertical synchronizing pulses will be recorded completely.

Thus, in the reproducing operation, the main signal reproduced by the main magnetic head 14 will also be represented by FIG. 8B. During reproduction, the auxiliary magnetic head 20 which is mounted on the disc 13 at a definite spacing, with respect to the main magnetic head 14, corresponding to an integer multiple of the horizontal synchronizing pulse period, for example 12H, will operate to reproduce a group of horizontal synchronizing pulses which contain the image signal reproduced by the main magnetic head 14 after 12H or later than 12H during the signal absence period reproduced by the main magnetic head.

Referring again to FIG. 6, signals produced by the main and auxiliary magnetic heads 14 and 20 are amplified, respectively, by pre-amplifiers 40 and 41 and are then supplied to a gate mixer circuit 42. The signals are mixed together in the circuit 42 so that the auxiliary signals produced by the auxiliary magnetic head will be inserted in the signal absence period of the main signal produced by the main magnetic head, thus providing a continuous signal as shown in FIG. 8C. The continuous signal will then be supplied to a demodulator 43 to be demodulated therein and derived out as a output signal from an output terminal 44. A portion of the output signal supplied to a synchronous segregator circuit 45, and a pulse synchronously segregated thereby will be utilized to control a gate pulse generator 46. The gate pulse generated thereby will be supplied to said gate mixer circuit 42 to function to selectively mix together said main and auxiliary signals. Thus by controlling the operation of the gate pulse generator by utilizing the pulse of the main signal it is possible to construct the circuit such that disorder of the phase of rotation of the magnetic head does not affect reproduced images. This object can be attained by other means. For example, the operation of the gate pulse generator may be controlled by a signal obtained by electrically or mechanically detecting the phase of rotation of the magnetic head.

As shown in FIG. 8C, during the vertical blanking period of the output signal, a portion of the next field image is included in the auxiliary signal so as to affect the reproduced image. However, as ordinary receivers are provided with their own blanking circuits which function to increase the bias voltage of the receiving tube during the blanking period, actually there is no fear that the surplus signal affects normal received image. Moreover, since a portion of the aft-stage equalizing pulse is absent, it may be expected that this will affect the horizontal phase. But, actually the result of experiment showed that there was no substantial trouble.

Thus, according to this modification it is possible to insert controlled synchronizing signals in the signal absence periods of the main signal by an extremely simplified circuit construction.

It should be understood that it is not always necessary to set the time difference between the main and auxiliary signals to be equal to 12H but may be shortened or lengthened as desired depending upon the value of absence period $d$ as determined by the construction of the apparatus, and that as the signal absence period is decreased said surplus image signal can be decreased. If this time difference is decreased below 6H, the aft-stage equalizing pulse can be perfectly reproduced without the necessity of reproducing surplus image signals, thus enabling ideal recording and reproducing of normal signals.

Summarizing the above this invention relates to an improvement of a system for magnetically recording and reproducing images of the type wherein image signals are recorded in a magnetic tape in such a manner that at least one field unit is included in each one of magnetic record zones with a portion of the vertical blanking period deleted and the invention is characterized by comprising a main magnetic head adapted to scan said magnetic record zones to reproduce the main signal including a signal absence period in at least one portion of the vertical blanking period, an auxiliary magnetic head adapted to scan the magnetic record zone to reproduce the same auxiliary signal as the main signal with a definite time difference with respect to the main signal, means to set said time difference in at least said main signal absence period and means to insert said auxiliary signal or a signal produced by utilizing said auxiliary signal as the reference in said signal absence period whereby to provide a continuous main signal. Accordingly the reproducing system of this invention can utilize magnetic tapes recorded with the conventional single magnetic record zone system so that treatment and mechanism of recording and reproducing are greatly simplified when compared with two magnetic record zone system. Moreover it is able to extremely accurately adjust the relative positions of the main and auxiliary magnetic heads and also to mount both heads upon the same rotating disc, thus simplifying fabrication and affording interchangeability of the component parts as well as magnetic heads. This greatly simplifies the operation and adjustment which are to be made by operators. Further, the number of magnetic tapes required can be reduced when compared with conventional two magnetic record zone system thus increasing the utilization factor of magnetic tapes.

While the invention has been explained by describing particular embodiment thereof, it will be apparent that improvements and modifications may be made without departing from the scope of the invention as defined in the appended claims.

What is claimed is:

1. A system of reproducing images which have been magnetically recorded on a magnetic tape having a plurality of magnetic record zones, each of said zones having been recorded with one field unit of an image signal and with at least a portion of the vertical blanking period deleted, said system comprising in combination: a main magnetic head adapted to scan said magnetic record zones to produce main signals as well as a signal absence period corresponding to at least a portion of the vertical blanking period, an auxiliary magnetic head adapted to scan said magnetic record zones to reproduced auxiliary signals at a predetermined time difference with respect to said main signals, means to set said time difference in at least said signal absence period of said main signals and to insert said auxiliary signals as the signal during said main signal absence period including, a mixer stage providing a selective output in response to fed pulses, wherein said main and auxiliary signals are mixed; a demodulator stage including a signal output terminal to demodulate said mixed signals and provide an output signal to said terminal; a synchronous generator circuit also fed by said demodulator circuit generating a synchronous signal from the signal fed by said demodulator; a pulse generator coupled to said synchronous generator circuit and receiving said synchronous signal therefrom and supplying feedback output pulses to said mixer stage so as to control selectively the output of the mixer stage to the demodulator stage providing a continuous non overlapping image therefrom.

2. A system of reproducing images which have been magnetically recorded on a magnetic tape having a plurality of magnetic record zones on said magnetic tape such that at least one field unit of an image signal is contained in each of said magnetic record zones and that a signal absence period is included in a blanking period having means to provide a continuous coherent signal output notwithstanding said signal absence period comprising in combination: a main magnetic head adapted to scan said magnetic record zones to produce main signals containing said signal absence periods, an auxiliary magnetic head adapted to scan said magnetic record zones to produce auxiliary signals having a predetermined time difference with respect to said main signals, means to set said time difference at least in said absence periods and means to insert said auxiliary signals in said main signal absence periods including fixed means supporting rotating means to spirally rotate said magnetic tape angularly past said main and auxiliary magnetic heads; emitting and sensing means mounted in opposed relationship on said fixed and rotating means to sense the angular movement of said tape; a mixer gate stage receiving the output signals from said main and auxiliary magnetic heads; a demodulator stage to demodulate the signal from the mixer gate stage; a pulse generating circuit coupled to the output of said sensing means and in turn supplying a gating pulse output to the mixer gate stage, and, logic gating circuitry coupled to and fed by said mixer gate stage and said pulse generating circuit supplying as the demodulator stage the main and auxiliary magnetic head signals in continuous sequence.

References Cited

UNITED STATES PATENTS

| | | | |
|---|---|---|---|
| 3,239,603 | 3/1966 | Kihara | 178—6.6 |
| 3,308,232 | 3/1967 | Numakura | 178—6.6 |
| 3,322,892 | 5/1967 | Yasuoka | 178—6.6 |

ROBERT L. GRIFFIN, *Primary Examiner.*

H. W. BRITTON, *Assistant Examiner.*